(12) United States Patent
Wang et al.

(10) Patent No.: US 12,312,710 B1
(45) Date of Patent: May 27, 2025

(54) METHOD FOR PREPARING DIRECT MELT-SPUN HIGH-VISCOSITY PBAT/LOW-VISCOSITY PET TWO-COMPONENT ELASTIC FIBER AND HIGH-VISCOSITY PBAT POLYMERIZATION REACTOR

(71) Applicant: JIANGSU GANGHONG FIBER CO., LTD., Suzhou (CN)

(72) Inventors: Rui Wang, Suzhou (CN); Shuchang Bian, Suzhou (CN)

(73) Assignee: Jiangsu Ganghong Fiber Co., Ltd., Suzhou (CN)

( * ) Notice: Subject to any disclaimer, the term of this patent is extended or adjusted under 35 U.S.C. 154(b) by 0 days.

(21) Appl. No.: 18/971,257

(22) Filed: Dec. 6, 2024

Related U.S. Application Data

(63) Continuation-in-part of application No. PCT/CN2024/120242, filed on Sep. 23, 2024.

(30) Foreign Application Priority Data

Jan. 12, 2024 (CN) .......................... 202410044589.9

(51) Int. Cl.
*B01F 27/191* (2022.01)
*B01F 27/23* (2022.01)
(Continued)

(52) U.S. Cl.
CPC .............. *D01F 8/14* (2013.01); *B01F 27/731* (2022.01); *B01J 19/0066* (2013.01);
(Continued)

(58) Field of Classification Search
CPC .... B01F 27/191; B01F 27/2322; B01F 27/73; B01F 27/731; B01J 19/0066; B01J 19/18;
(Continued)

(56) References Cited

U.S. PATENT DOCUMENTS

| | | | | |
|---|---|---|---|---|
| 6,210,622 B1* | 4/2001 | Reese | ....................... | D02J 1/22 |
| | | | | 264/479 |
| 2015/0080534 A1* | 3/2015 | Lim | ......................... | D01D 5/08 |
| | | | | 264/176.1 |
| 2015/0252494 A1* | 9/2015 | Tu | .......................... | C08L 67/02 |
| | | | | 525/444 X |

FOREIGN PATENT DOCUMENTS

| | | |
|---|---|---|
| CN | 101126180 A | 2/2008 |
| CN | 101851812 A | 10/2010 |
| | (Continued) | |

OTHER PUBLICATIONS

Polymer Chemistry and Technology dated May 1, 1991, 2 pages.

*Primary Examiner* — Leo B Tentoni
(74) *Attorney, Agent, or Firm* — Dinsmore & Shohl LLP

(57) ABSTRACT

A method for preparing direct melt-spun high-viscosity PBAT/low-viscosity PET two-component elastic fiber and a high-viscosity PBAT polymerization reactor. This method uses two production lines respectively used to produce a high-viscosity PBT melt and a low-viscosity PET melt, which are then spun. The high-viscosity PBAT production line comprises a first esterification reactor, a second esterification reactor, a first prepolymerization reactor, a second prepolymerization reactor, and a high-viscosity PBAT polymerization reactor. The polymerization reactor is designed with a special disc structure in a parallel two-shaft disc reactor, and the two shafts are rotated in opposite directions, improving the devolatilization effect and self-cleaning, significantly increasing the viscosity. By using this method, the cost is low and the production capacity is high, the process flow is shortened, the fiber strength can reach 2.55~2.85 cN/dtex, the crimp shrinkage rate can reach 25%~60%, and the crimp stability can reach 58%~70%.

18 Claims, 1 Drawing Sheet

(51) Int. Cl.
*B01F 27/2322* (2022.01)
*B01F 27/73* (2022.01)
*B01J 19/00* (2006.01)
*B01J 19/18* (2006.01)
*B29B 7/48* (2006.01)
*B29B 7/64* (2006.01)
*C08F 2/00* (2006.01)
*C08G 63/16* (2006.01)
*C08G 63/183* (2006.01)
*C08G 63/82* (2006.01)
*C08G 63/85* (2006.01)
*C08G 85/00* (2006.01)
*C08L 67/02* (2006.01)
*D01D 1/04* (2006.01)
*D01D 5/08* (2006.01)
*D01D 5/32* (2006.01)
*D01F 6/84* (2006.01)
*D01F 8/14* (2006.01)

(52) U.S. Cl.
CPC .......... *B01J 19/1862* (2013.01); *B29B 7/481* (2013.01); *C08F 2/001* (2013.01); *C08G 85/006* (2013.01); *D01D 5/08* (2013.01); C08L 2203/12 (2013.01); D10B 2331/04 (2013.01); D10B 2401/061 (2013.01)

(58) Field of Classification Search
CPC ........ B01J 19/1862; B29B 7/481; B29B 7/64; C08F 2/001; C08G 63/16; C08G 63/183; C08G 63/82; C08G 63/85; C08G 85/006; C08J 3/201; C08L 67/02; C08L 2203/12; D01D 1/04; D01D 5/08; D01D 5/32; D01F 6/84; D01F 8/14; D10B 2331/04; D10B 2401/061
USPC .............. 264/172.14, 172.17, 176.1, 331.21; 366/71, 96, 301, 312; 422/134, 135; 525/444; 526/65; 528/274, 279, 302, 528/308.3, 308.8
See application file for complete search history.

(56) References Cited

FOREIGN PATENT DOCUMENTS

| | | |
|---|---|---|
| CN | 106337212 A | 1/2017 |
| CN | 107964690 A | 4/2018 |
| CN | 111101237 A | 5/2020 |
| CN | 212819825 U | 3/2021 |
| CN | 114272789 A | 4/2022 |
| CN | 115613159 A | 1/2023 |

* cited by examiner

METHOD FOR PREPARING DIRECT MELT-SPUN HIGH-VISCOSITY PBAT/LOW-VISCOSITY PET TWO-COMPONENT ELASTIC FIBER AND HIGH-VISCOSITY PBAT POLYMERIZATION REACTOR

CROSS-REFERENCE TO RELATED APPLICATIONS

This application is a Continuation-in-Part of PCT App. Serial No. PCT/CN2024/120242, having an International Filing Date of Sep. 23, 2024, which claims the benefit of priority to Chinese Patent Application No. 2024100445899 filed on Jan. 12, 2024, and the entire disclosure of both are hereby incorporated by reference.

TECHNICAL FIELD

The present disclosure relates to a method for preparing direct melt-spun high-viscosity PBAT/low-viscosity PET two-component elastic fiber and a high-viscosity PBAT polymerization reactor.

BACKGROUND

The application scope of elastic fibers in the modern chemical fiber industry is becoming increasingly wide, especially in recent years, with the rapid development of two-component elastic fiber theory, there has been a deeper understanding of the forming mechanism and elasticity generation mechanism of parallel two-component elastic fibers, and the variety of elastic fibers have also made significant progress compared to the original technology. At the beginning of the 1970s, DuPont first launched the single-component elastic fiber spandex, which quickly became popular in the market with its unique style and characteristics, and in the late 1970s, they also launched the parallel two-component elastic fiber T800, which uses PBT/PET parallel composite to produce good elastic effects, however, due to the low glass transition temperature of PBT components (26~42° C.), PBT/PET elastic fibers exhibit rapid crystallization characteristic under stress, and the T800 elastic fiber has poor elastic recovery rate and shape retention; entering the 21 st century, with the successful industrialization of chemical and biological fermentation methods for PDO, PTT polyester has attracted attention for its unique molecular structure and excellent elastic recovery performance, DuPont T400, a PTT/PET two-component elastic fiber, has been launched, the PTT/PET two-component parallel composite fiber has excellent elastic recovery rate and shape retention, and will not deform after repeated stretching, its elastic slow-release effect overcomes the bound feeling of the elastic fiber spandex, and it has become the best elastic fiber variety in the fabric industry with its characteristics such as excellent resistance to chlorine bleaching and light exposure.

The development of two-component elastic fibers has become a key area of industry development in the past decade, the latest progress is to take advantage of the different orientation and crystallization behavior between PET polyester components with different viscosities, and during the spinning process, the high-viscosity component and the low-viscosity component exhibit elastic curls due to the different speed and percentage of transition from the orientation state to the crystalline state, forming a spring-like structure, thus exhibiting good elastic effect on the fabric. Patents CN111101237A, CN101126180A, CN106337212A, CN107964690A, CN101851812A, CN115613159A, etc., respectively disclose a series of parallel composite elastic fibers such as PET/PET, PBT/PET, PTT/PET and preparation methods thereof, and methods of preparing easily or deeply dyed elastic fibers using modified PET with elastic retention, such as high-viscosity ECDP, high-viscosity high-shrinkage polyester, high-viscosity polyester easily dyed by disperse dye, high-viscosity CDP cationic polyester, etc., and low-viscosity PET polyester.

The above-mentioned preparation methods of the elastic fibers are based on the production process of chip spinning of high-viscosity chips and low-viscosity chips respectively through pre-crystallization, melting of drying screw, to composite spinning and composite parallel spinneret forming, although the basic problems of parallel composite spinning technology are solved, chip spinning technology has obvious defects such as long process, high cost, low production capacity, and poor product quality stability.

PBT/PET two-component composite elastic fibers have the characteristics of moderate elasticity, low price, and good clothing comfort, their cost is only half of that of PTT/PET two-component fibers, their crimp shrinkage rate is significantly higher than that of PET/PET composite elastic fibers, combined with their stress relief effect, they have good market application scope.

PBAT belongs to thermoplastic biodegradable materials, is a copolymer of butylene adipate and butylene terephthalate, and combines the characteristics of PBA and PBT, with good ductility and elongation at break, as well as good heat resistance and impact resistance. PBAT/PET two-component composite elastic fiber has better elasticity than PBT/PET, its good softness is more suitable for women's clothing characteristics, its cost is basically the same as PBT/PET elastic fiber, but significantly lower than PTT/PET elastic fiber and spandex, therefore, the application scenarios and effects of PBAT/PET two-component composite elastic fiber are excellent.

However, the crimp shrinkage rate, crimp stability, and quality stability of PBAT/PET two-component fibers in the existing technology are not high enough, and there is still a lot of room for improvement. When synthesizing PBAT, a large amount of tetrahydrofuran byproduct is generated in the polymerization system due to the cyclo-dehydration of raw material 1,4-butanediol, and this byproduct has a significant impact on the polymerization system and the resulting product PBAT, so how to control the content of tetrahydrofuran byproduct is a difficult point in the PBAT synthesis process.

SUMMARY OF THE INVENTION

A purpose of the present disclosure is to provide a high-viscosity PBAT polymerization reactor for preparing a high-viscosity PBAT melt, and the high-viscosity PBAT melt prepared using the polymerization reactor has high viscosity, and can significantly improve the fiber properties when used for preparing a high-viscosity PBAT/low-viscosity PET direct melt-spun two-component elastic fiber.

Another purpose of the present disclosure is to provide a direct melt-spun high-viscosity PBAT/low-viscosity PET two-component elastic fiber, of which the crimp shrinkage rate, crimp stability, and quality stability are significantly improved.

Still another purpose of the present disclosure is to provide a method for preparing a direct melt-spun high-viscosity PBAT/low-viscosity PET two-component elastic fiber, the preparation method has significantly reduced cost, high production capacity, and greatly shortened process, and the crimp shrinkage rate, crimp stability, and quality stability of the elastic fiber prepared by this method are significantly improved.

To achieve the above purpose, a technical solution employed by the present disclosure is:

A high-viscosity PBAT polymerization reactor, is used to prepare a high-viscosity PBAT melt for preparing a high-viscosity PBAT/low-viscosity PET two-component elastic fiber, the high-viscosity PBAT polymerization reactor is a horizontal polymerization reactor, and comprises a main body containing a chamber inside, the main body comprises a low viscosity zone, a med-high viscosity zone, and a high viscosity zone disposed in sequence along the axial direction of the high-viscosity PBAT polymerization reactor, the viscosity of the PBAT melt in the low viscosity zone, the med-high viscosity zone and the high viscosity zone increases in sequence; the high-viscosity PBAT polymerization reactor further comprises two agitating shafts disposed in parallel in an axial direction and running through the low viscosity zone, the med-high viscosity zone and the high viscosity zone, the rotation directions of the two agitating shafts are opposite, each of the agitating shafts is provided with a plurality of discs, the circumference of the discs are circular, and the distance between the two agitating shafts is 1.05-1.10 times the radius of the discs, and the discs on the two agitating shafts partially overlap.

In the present disclosure, the material for polymerization is polymerized mainly on the discs.

In the present disclosure, the distance between the two agitating shafts refers to the distance between the axis lines of the two agitating shafts. In the present disclosure, the partial overlap of the discs on the two agitating shafts refers to the spatial overlap and intersection of the discs on the two agitating shafts. The configuration of the distance between the two agitating shafts being 1.05-1.10 times the radius of the discs may ensure that the discs on the two parallel agitating shafts intersect each other at the maximum area, forming efficient shear mixing.

In some implementations, the discs in the low viscosity zone are of a single-disc design, the discs in the med-high viscosity zone are of a single-disc design, and the discs in the high viscosity zone are of a two-disc combination design with each two-disc combination being provided with 8~12 spokes. Such spoke is a reinforced structure that can adapt to the melt film pulling requirements under high dynamic viscosity conditions in the high viscosity zone.

In the present disclosure, the two-disc combination design means that two adjacent disc reactors are fixedly connected, and rotate together with the agitating shaft. In the present disclosure, the spokes refer to radiating strips extending from the agitating shafts to the outer circumferences of the discs.

In some implementations, from the low viscosity zone to the med-high viscosity zone to the high viscosity zone, the spacing between two adjacent discs increases successively; the spacing between two adjacent discs in the high viscosity zone is 60-100 mm.

In some implementations, from front to rear along the axial direction of the high-viscosity PBAT polymerization reactor, the spacing between the disc combinations of the two-disc combination design in the high viscosity zone increases successively, and is controlled to 120-200 mm.

In some implementations, the total number of discs in the low viscosity zone and the med-high viscosity zone is 35 to 55, the total number of discs in the high viscosity zone is 20 to 30.

In some implementations, the lengths of the low viscosity zone, the med-high viscosity zone and the high viscosity zone are all one-third of the length of the high-viscosity PBAT polymerization reactor.

In the present disclosure, one-third is not an exact value of one-third, but refer to a value roughly or around one-third, approximately equal to one-third.

In some implementations, the high-viscosity PBAT polymerization reactor further comprises a prepolymer inlet located at the bottom of the front end of the low viscosity zone and a high-viscosity PBAT melt outlet located at the bottom of the rear end of the high viscosity zone, wherein the high-viscosity PBAT melt outlet is in the shape of a trumpet-shaped.

In some implementations, a composite scraper is further provided at two sides of the high viscosity zone between the two-disc combinations, the composite scraper comprises an axial scraper for scraping off the melt on the agitating shafts, a wall scraper for scraping off the melt on the inner wall of the high-viscosity PBAT polymerization reactor, a disc scraper for scraping off the melt on the discs, and a bottom scraper for scraping off the melt on the bottom of the polymerization reactor, and the distance between the disc scrapers and the discs is 55-75 mm. By using such composite scrapers, it is possible to ensure that the high-viscosity melt has a good feeding effect under efficient devolatilization conditions.

The design of the high-viscosity PBAT polymerization reactor of the present disclosure is different from that of the conventional parallel biaxial disc reactor, although parallel biaxial agitation has efficient shear effect, for PBAT, which has high viscosity and elasticity, when the intrinsic viscosity is higher than 1.15, it is still prone to causing the rod-climbing effect of the melt, therefore, for the PBAT polymerization reactor design, a low agitating speed is appropriate, and the composite scrapers are designed between the discs in the high viscosity zone, the disc scrapers can control the film thickness of the melt on the disc surfaces, the wall scrapers can renew the material on the reactor wall timely, the axial scrapers clean the agitating shaft, and the bottom scrapers control the thickness of the melt at the bottom of the polymerization reactor.

The high-viscosity PBAT polymerization reactor of the present disclosure is designed with a special disc structure of parallel twin-shaft discs, which has high material mass transfer efficiency, and two discs rotating in opposite directions form an efficient shear effect, producing a good self-cleaning effect; the discs in the front half of the reactor are single-disc with a small spacing, which is suitable for the requirements of a large devolatilization area and a rapid increase in viscosity of the low-viscosity melt. The high viscosity zone in the rear end is designed with multiple sets of two-disc combination, and reinforced disc structure, to meet the needs of a significant increase in the torque for the high-viscosity melt, at the same time, the spacing between discs in the two-disc in the rear end is controlled between 60 and 100 mm, gradually increases according to the increase in viscosity; the spacing between the disc combinations in the two-disc combination is controlled between 120 and 200 mm, and gradually increases in the axial direction according to the viscosity from low to high; for the two-disc combinations in the rear end, a 1.0~3.0° angle is designed between the spokes of the two-disc combinations along the rotation direction of the shafts, and the material pushing effect is generated by the misalignment of the angle.

The present disclosure adopts an up-down parallel two-shaft disc design, which has higher devolatilization efficiency and significantly shortens the polymerization reaction time compared to conventional front-rear two-shaft disc reactor, the residence time of the high viscosity polymerization reactor is 40-55% (80-120 min) of the conventional front-rear two-shaft disc reactor design, the reaction speed is increased, and the residence time is significantly reduced, effectively suppressing the level of side reactions and improving the quality of the high-viscosity PBAT polyester melt.

The present disclosure also provides a method for preparing a high-viscosity PBAT/low-viscosity PET two-component elastic fiber using the aforementioned high-viscosity PBAT polymerization reactor, the two-component elastic fiber contains a high-viscosity PBAT component and a low-viscosity PET component, and the viscosity of the high-viscosity PBAT component is greater than that of the low-viscosity PET component, and the preparation method comprises steps of preparing a high-viscosity PBAT melt and a low-viscosity PET melt separately, and spinning the high-viscosity PBAT melt and the low-viscosity PET melt through the same parallel composite spinning assembly to obtain the two-component elastic fiber; the viscosity of the high-viscosity PBAT melt is greater than the viscosity of the low-viscosity PET melt; the step of preparing a high-viscosity PBAT melt comprises a step of sequentially passing terephthalic acid and 1,4-butanediol through a first esterification reactor for a first esterification reaction, through a second esterification reactor for a second esterification reaction, through a first prepolymerization reactor and a second prepolymerization reactor for prepolymerization reactions to give a PBAT prepolymer, a step of adding a 1,4-butylene adipate prepolymer to the second esterification reactor when carrying out the second esterification reaction, and a step of polymerizing the PBAT prepolymer in the aforementioned high-viscosity PBAT polymerization reactor to obtain the high-viscosity PBAT melt; the step of preparing low-viscosity PET melt comprises a step of sequentially passing terephthalic acid and ethylene glycol through a first esterification reactor and a second esterification reactor for esterification reactions, through a first prepolymerization reactor and a second prepolymerization reactor for prepolymerization reactions to give a PET prepolymer, and a step of polymerizing the PET prepolymer in a low-viscosity PET final polymerization reactor to obtain the low-viscosity PET melt.

In the present disclosure, PBAT refers to a copolymer of butylene adipate and butylene terephthalate, and PET refers to polyethylene terephthalate.

In some implementations, in percent by weight, the two-component elastic fiber contains 30%-70% of high-viscosity PBAT component and 70%-30% of low-viscosity PET component.

In some implementations, the high-viscosity PBAT melt has an intrinsic viscosity of 1.05~1.30 at 25° C., and a dynamic viscosity of 315~905 Pa·s at 252° C. (measured at 252° C.); the low-viscosity PET melt has an intrinsic viscosity of 0.45~0.55 at 25° C., and a dynamic viscosity of 90~240 Pa·s at 275° C. (measured at 275° C.).

In some implementations, the high-viscosity PBAT melt has an intrinsic viscosity of 0.95~ 1.10 at 25° C., and a dynamic viscosity of 430~900 Pa·s at 252° C.

In some implementations, the high-viscosity PBAT melt has an intrinsic viscosity of 0.97~ 1.05 at 25° C., and a dynamic viscosity of 500~750 Pa·s at 252° C.

In the present disclosure, the intrinsic viscosity is measured in a mixed solvent of phenol and tetrachloroethane in a volume ratio of 3:2.

In some implementations, in the same parallel composite spinning assembly, the high-viscosity PBAT melt has a dynamic viscosity of 270~650 Pa·s at 252° C., and the low-viscosity PET melt has a dynamic viscosity of 70~220 Pa·s at 275° C.

In some implementations, the number average molecular weight of the 1,4-butylene adipate prepolymer is between 1,600 and 2,500.

In some implementations, the 1,4-butylene adipate prepolymer is prepared by esterification and prepolymerization of adipic acid and 1,4-butanediol.

In some implementations, the molar ratio of adipic acid monomer units in the 1,4-butylene adipate prepolymer to the terephthalic acid is (45-55):(45-55).

In some implementations, the esterification and prepolymerization of adipic acid and 1,4-butanediol are carried out in the presence of a proton acid catalyst.

In some implementations, the esterification reaction in the first esterification reactor used for preparing the high-viscosity PBAT melt is carried out at an absolute pressure of 40~60 kPa.

In some implementations, the esterification reaction in the second esterification reactor used for preparing the high-viscosity PBAT melt is carried out at atmospheric pressure.

In some implementations, the second esterification reactor used for preparing the high-viscosity PBAT melt is a horizontal reactor and comprises three compartments arranged in sequence from front to rear.

In some implementations, when preparing the high-viscosity PBAT melt, the preparation method further comprises a step of adding a side reaction inhibitor to the first compartment from front to rear of the second esterification reactor, the side reaction inhibitor is a Lewis base.

In some implementations, the Lewis base is selected from the group consisting of triethanolamine, quaternary ammonium salts, ethylenediaminetetraacetic acid, sodium acetate, sodium benzoate, sodium formate, potassium succinate, lithium acetate, zinc acetate, and combinations thereof.

In some implementations, the mass of the Lewis base is 50~500 ppm of the mass of the high-viscosity PBAT melt.

In some implementations, the mass of the Lewis base is 100~400 ppm of the mass of the high-viscosity PBAT melt.

In some implementations, the mass of the Lewis base is 150~200 ppm of the mass of the high-viscosity PBAT melt.

In the present disclosure, the side reaction inhibitor is a Lewis base, its function is to improve the pH environment in the second esterification reactor under weakly acidic conditions, suppress the degree of etherification reaction of the raw material 1,4-butanediol to produce tetrahydrofuran, and the comprehensive effect can effectively reduce the production of tetrahydrofuran by 15% to 20%.

In some implementations, when preparing the high-viscosity PBAT melt, the preparation method further comprises a step of adding an esterification catalyst to the first esterification reactor before carrying out the first esterification reaction, the esterification catalyst is selected from the group consisting of tetrabutyl titanate, tetraisopropyl titanate, and tetra (2-ethylhexyloxy) titanate. Tetra (2-ethylhexoxy) titanate is preferred, and a TOT catalyst produced by Nippon Soda Co., Ltd., is more preferred, which is not easily hydrolyzed, more stable, and conducive to the stable polymerization of PBAT.

In some implementations, when preparing the high-viscosity PBAT melt, the preparation method further comprises a step of adding a polymerization catalyst to the first prepolymerization reactor before carrying out the prepolymerization reaction.

In some implementations, the polymerization catalyst is prepared by reacting a titanate with a protonic acid under anhydrous conditions, removing alcohol by-products, and dissolving the reaction system in 1,4-butanediol.

In some implementations, the titanate is selected from the group consisting of tetrabutyl titanate, tetraisopropyl titanate, and tetra (2-ethylhexyloxy) titanate.

In some implementations, the protonic acid is selected from the group consisting of formic acid, acetic acid, propionic acid, oxalic acid, malonic acid, succinic acid, citric acid, tripolyphosphoric acid, polyphosphoric acid, and combinations thereof.

In some implementations, the mass ratio of the titanate to the protonic acid is 1:(0.5-2.0).

In some implementations, the mass percentage of titanium element in the polymerization catalyst is 1.0%-3.0%.

In some implementations, the mass of titanium element in the esterification catalyst accounts for 30~40 ppm of the mass of the high-viscosity PBAT melt.

In some implementations, the mass of titanium element in the polymerization catalyst accounts for 50~70 ppm of the mass of the high-viscosity PBAT melt.

In some implementations, the preparation method controls the residence time of material in the high-viscosity PBAT polymerization reactor is 75~120 min.

In the high-viscosity PBAT polymerization reactor of the present disclosure, the residence time of material is controlled to be 75~120 min, which is much better than the residence time of 180 to 300 min in the conventional front-rear two-shaft disc reactor, and the full volume of the high-viscosity PBAT polymerization reactor of the present disclosure is about half of that of the conventional disc reactor, which can greatly reduce the level of side reactions, and inhibit the production of tetrahydrofuran during the production process of the high-viscosity PBAT melt. The production capacity of the high viscosity reactor can reach 20,000 to 80,000 tons per year, arranged according to production capacity requirements. It can meet the thickening effect of the high-viscosity PBAT: an intrinsic viscosity of 1.05~1.30 (3:2), and a dynamic viscosity of 315~905 Pa·s (252° C.).

In some implementations, the PBAT prepolymer introduced into the high-viscosity PBAT polymerization reactor has an intrinsic viscosity of 0.300~0.360. After the melt with this viscosity enters the high-viscosity PBAT polymerization reactor (parallel two-shaft final polymerization reactor), it can more effectively meet the requirements of disc design, reduce the overall material load on the disc surface of the polymerization reactor, obtain the optimal material residence time, and significantly reduce the side reaction level in the polymerization reactor, to minimize the amount of non-condensable gas produced.

In some implementations, the PBAT prepolymer introduced into the high-viscosity PBAT polymerization reactor has an intrinsic viscosity of 0.315~0.345.

In some implementations, the PBAT prepolymer introduced into the high-viscosity PBAT polymerization reactor has an intrinsic viscosity of 0.325~0.330.

In some implementations, when preparing the high-viscosity PBAT melt, the 1,4-butylene adipate prepolymer is added to the second esterification reactor from the third compartment from front to rear of the second esterification reactor.

In some implementations, the first esterification reactor and the second esterification reactor used for preparing the high-viscosity PBAT melt are both provided with distillation columns at their upper ends, and the preparation method further comprises steps of extracting a mixture of water and tetrahydrofuran from the top of the two distillation columns, and extracting 1,4-butanediol from kettles of the columns.

In some implementations, the preparation method further comprises a step of separating the mixture of water and tetrahydrofuran through a distillation column to obtain tetrahydrofuran.

In some implementations, the preparation method further comprises a step of recovering the extracted 1,4-butanediol.

In the present disclosure, when preparing the high-viscosity PBAT, the distillation column arranged on the first esterification reactor adopts a pressure reducing design, the first esterification reactor is a reduced-pressure esterification reactor, with its operating pressure being controlled at 40~60 kPa (absolute pressure), the top of the column is provided with a by-product reflux system, an extraction system (water+tetrahydrofuran from the esterification reaction), and a liquid ring vacuum pump, the second esterification reactor is of a multi-chamber and atmospheric-pressure design, and is designed to have a separate distillation column, an independently developed side reaction inhibitor, a Lewis base, is injected into the first compartment of the second esterification reactor, a poly(1,4-butylene adipate prepolymer) with a molecular weight of 1,600~2,500 is injected into the third compartment of the second esterification reactor, which has strong acidity, therefore, the body and all internals of the second esterification reactor are preferably made of SUS316L material; the distillation column of the second esterification reactor is designed to resist strong acidic corrosion of adipic acid for a long period of time, therefore, the column body and internals are all made of titanium and designed for atmospheric pressure, and the reflux system at the top of the column is made of 316L material.

The recovery may be carried out using a special recovery device. After the recovery, the impurities in 1,4-butanediol are removed to refine, the refined 1,4-butanediol may be re-added to the raw material pulping system for subsequent esterification and polymerization.

Preferably, the distillation column at the upper end of the second esterification reactor is disposed in the third compartment from front to rear of the second esterification reactor.

In some implementations, the high-viscosity PBAT polymerization reactor further comprises a steam feed inlet for introducing superheated 1,4-butanediol steam at the top of the main body located in the rear end portion of the low viscosity zone, the rear end portion of the med-high viscosity zone and the rear end portion of the high viscosity zone, and the preparation method further comprises steps of using a metering system to meter the superheated 1,4-butanediol steam and introducing it into the high-viscosity PBAT polymerization reactor. Its function is that gel cross-linking carbonization can be formed at the upper portion of the reactor on the rear end after the melt reactor runs for a period of time, the function of providing the 1,4-butanediol steam inlet is to facilitate regular cleaning on the basis of no shutdown, so as to maintain the long-term operation capacity of the device.

In some implementations, the high-viscosity PBAT polymerization reactor is connected to a vacuum pump, and the ultimate vacuum degree of the vacuum pump is 60~75 Pa, and the preparation method controls the pumping rate of the vacuum pump to be 85~230 kg/h; the vacuum degree in the high-viscosity PBAT polymerization reactor is controlled to 90~150 Pa. This configuration can meet the production capacity of high-viscosity PBAT polyesters of 30,000 to 100,000 tons/year. According to experimental research data, the volatile matter generation of the high-viscosity (intrinsic viscosity of 1.05~1.16) PBAT polymerization reactor is 1.5~2.2 times that of conventional-viscosity (intrinsic viscosity of 0.92) PBAT polymerization devices, and the higher the viscosity at the high viscosity outlet, the higher the amount of non-condensable gas produced, therefore, the pumping design of the vacuum pump is 1.5~2.5 times that of conventional polymerization devices with the same production capacity, and according to the production capacity of 30,000~100,000 tons/year, the pumping capacity of the vacuum pump is selected in the range of 70~220 kg/h. The design of the vacuum system for the device considers the hazards of tetrahydrofuran, and adopts a fully enclosed design, and a neutralization device is designed for wastewater and exhaust gas, which is then sent to a stripping column for treatment, to meet emission standards.

In some implementations, when preparing the high-viscosity PBAT melt, the preparation method further comprises a step of introducing a heat stabilizer and an antioxidant or a colorant into the second esterification reactor before the second esterification reaction; the heat stabilizer is selected from the group consisting of trimethyl phosphate, triethyl phosphate, triphenyl phosphate, triphenyl phosphite, triglycerol phosphate, and combinations thereof; the antioxidant is selected from the group consisting of Antioxidant 168, Antioxidant 1076, Antioxidant 1010, Antioxidant 1222, benzothiazole antioxidants, and combinations thereof.

In some implementations, the usage amount of the heat stabilizer or the antioxidant is 500~1200 ppm of the total mass of the high-viscosity PBAT melt.

To ensure the excellent anti-thermal degradation and anti-thermal oxidative degradation functions of the high-viscosity PBAT melt during the transportation processes of esterification and polymerization melts, heat stabilizers and antioxidants are used for compounding, and to improve the stability of the high-viscosity PBAT melt, the above additives can be added to respectively improve the thermal stability and antioxidant properties of the melt. To control the side reaction level in polymerization under high temperature conditions, the above-mentioned heat stabilizers and antioxidants are added, and antioxidants are to further reduce the thermal degradation caused by trace oxygen during the melt transport processes.

Heat stabilizers and antioxidants are beneficial for reducing the viscosity drop level during the melt transport processes, for the high-viscosity PBAT melt transport, the residence time in the pipeline is within 30~40 min, and the viscosity drop of the high-viscosity PBAT melt is effectively controlled between 0.050 and 0.105, a more optimized viscosity drop level is between 0.075 and 0.095, and when combined with the design of short process melt transport, the optimal viscosity drop is between 0.085 and 0.090, compared with the existing viscosity drop of 0.150 to 0.235 for the high-viscosity PBAT polyester with an increased viscosity, it can significantly reduce the original intrinsic viscosity of the melt and effectively improve product quality.

In some implementations, melt pumps are used to transport the high-viscosity PBAT melt and the low-viscosity PET melt, and melt coolers are disposed at outlets of the melt pumps; the preparation method controls the temperature of the high-viscosity PBAT melt after being cooled by the melt cooler to be between 252 and 253° C.; filters and booster pumps are disposed between the melt pumps and the parallel composite spinning assembly; the preparation method controls the transport time of the high-viscosity PBAT melt to be 40~50 min.

In some implementations, the preparation method further comprises a step of disposing a screw propulsion pump between the high-viscosity PBAT melt outlet and the melt pump to propel the high-viscosity PBAT melt.

In some implementations, the low-viscosity PET final polymerization reactor is a horizontal polymerization reactor, and the length-to-diameter ratio thereof is (2.2~2.8):1.0.

In some implementations, the length-to-diameter ratio of the high-viscosity PBAT polymerization reactor is (3.0~3.6):1.0, which is beneficial for distributing more disc reactors to increase the effective devolatilization area, improve the vacuum degree of the reactor, and achieve the goal of increasing the viscosity of PBAT melt and reducing the level of side reactions, and it can also be combined with high vacuum design to quickly increase the viscosity of high-viscosity PBAT melt.

In some implementations, the preparation method further comprises a step of introducing a viscosity reducer into the high-viscosity PBAT melt before the high-viscosity PBAT melt passes through a filter; the viscosity reducer is selected from the group consisting of poly(ethylene terephthalate-co-1,4-cyclohexanedimethylene terephthalate) (PETG), cationic dyeable polyester (CDP), easy cationic dyeable polyester (ECDP), atmospheric pressure boiling dyeing polyester EDDP, polybutylene terephthalate (PBT), and poly(trimethylene terephthalate) (PTT), and combinations thereof.

In some implementations, the usage amount of the viscosity reducer is 0.2% to 3.0%, preferably 0.5% to 2.0%, and more preferably 0.8% to 1.5% of the total mass of the melt, the addition of the viscosity reducer can significantly reduce the kinematic viscosity of the high-viscosity melt, improve the efficiency of melt transport, and reduce the degradation in the process.

In some implementations, the molar ratio of terephthalic acid to 1,4-butanediol is 1:(1.05-1.65).

In some implementations, when preparing the high-viscosity PBAT melt, the first esterification reaction is carried out 245° C.~247° C.

In some implementations, when preparing the high-viscosity PBAT melt, the second esterification reaction is carried out 248° C.~252° C.

In some implementations, the prepolymerization reaction in the first prepolymerization reactor used for preparing the high-viscosity PBAT melt is carried out at 250° C.~252° C.

In some implementations, the prepolymerization reaction in the first prepolymerization reactor used for preparing the high-viscosity PBAT melt is carried out at a pressure of 7~10 kPa.

In some implementations, the prepolymerization reaction in the second prepolymerization reactor used for preparing the high-viscosity PBAT melt is carried out at 251° C.~252° C.

In some implementations, the prepolymerization reaction in the second prepolymerization reactor used for preparing the high-viscosity PBAT melt is carried out at a pressure of 0.5~1.5 kPa.

In some implementations, the same spinning assembly is a composite spinning box.

In some implementations, the composite spinning box comprises a composite spinneret.

The present disclosure further provides a high-viscosity PBAT/low-viscosity PET two-component elastic fiber prepared by the above-mentioned preparation method.

In some implementations, the two-component elastic fiber has a strength of 2.55~2.85 cN/dtex, a crimp shrinkage rate of 25%~60%, and a crimp stability of 58%~70%.

Due to the use of the above technical solutions, the present disclosure has the following advantages over the prior art:

The present disclosure takes into account the low polymerization temperature of PBAT (generally 248~255° C.), the formation of a 1,4-butylene adipate block copolymer component during the polymerization process, and the high acidity of the melt polymerization atmosphere, 1,4-butanediol being more likely to generate the byproduct tetrahydrofuran in a large amount under acidic catalysis, good flowability and low hanging efficiency in the low viscosity zone of the PBAT melt due to its low dynamic viscosity, while high viscoelasticity and being prone to staying on the disc surface for a long time in the high viscosity zone, therefore, for the design of the final polymerization reactor for direct melt-spun high-viscosity PBAT melt, an up-down parallel two-shaft disc design is adopted, which has higher devolatilization efficiency and significantly shortens the polymerization reaction time compared to conventional front-rear twin-shaft disc reactor, the residence time of the high viscosity polymerization reactor is 40-55% (80-120 min) of the conventional front-rear twin-shaft disc reactor design, the reaction speed is increased, and the residence time is significantly reduced, effectively suppressing the level of side reactions and improving the quality of the high-viscosity PBAT polyester melt.

The high-viscosity PBAT polymerization reactor of the present disclosure is designed with a special disc structure of parallel two-shaft discs, which has high material mass transfer efficiency, and two discs rotating in opposite directions form an efficient shear effect, producing a good self-cleaning effect. In the high-viscosity PBAT polymerization reactor, the discs in the front half (the low viscosity zone and the med-high viscosity zone) are single-disc with a small spacing, which is suitable for the requirements of a large devolatilization area and a rapid increase in viscosity of the low-viscosity melt. The high viscosity zone in the rear end is designed with multiple sets of two-disc combination, which adopts a reinforced disc structure, to meet the needs of a significant increase in the torque for the high-viscosity melt.

The present disclosure utilizes two different polyester production lines to produce a high-viscosity PBAT polyester and a low-viscosity PET polyester, respectively, the two melts of different viscosities are then transported to the same parallel composite spinning assembly through melt transport, after which the high-viscosity PBAT/low-viscosity PET two-component elastic fiber is prepared, achieving the preparation of direct melt-spun high-viscosity PBAT/low-viscosity PET parallel elastic fiber.

In the present disclosure, a special polymerization catalyst is used, which is prepared by reacting a titanate with a protonic acid under anhydrous conditions, removing alcohol by-products, and dissolving in 1,4-butanediol, the polymerization catalyst does not contain Ti—OH groups and can significantly inhibit the hydrolysis of ordinary titanium-based catalysts during the polymerization stage, thereby significantly inhibiting the occurrence of side reactions during the polymerization stage, which is beneficial for improving the properties of the high-viscosity PBAT melt and the properties of the final two-component elastic fiber.

In the present disclosure, the intrinsic viscosity of the high-viscosity PBAT melt may reach 1.05~1.30, the intrinsic viscosity of the low-viscosity PET melt is 0.45~0.55, and the viscosity of this high-viscosity PBAT melt is much higher than that of the prior art.

The two-component elastic fiber of the present disclosure has a strength of 2.5~2.85 cN/dtex, a crimp shrinkage rate of 25%~60%, and a crimp stability of 58%~70%, which are much higher than the levels of existing two-component elastic fibers. The two-component elastic fiber of the present disclosure can be various varieties such as FDY, POY, DTY, etc.

The industrial production of two-component elastic fibers using the preparation method of the present disclosure may achieve a production capacity of low-viscosity PET melt of 30,000~80,000 tons/year and a production capacity of high-viscosity PBAT melt of 30,000 to 80,000 tons/year, and when the product is the high-viscosity PBAT/low-viscosity PET direct melt-spun two-component elastic fiber, the overall production capacity of the device is 60,000 to 160,000 tons/year.

Wherein, 1—low viscosity zone, 2—med-high viscosity zone, 3—high viscosity zone, 4—composite scraper, 5—disc scraper, 6—axial scraper, 7—wall scraper, 8—agitating shaft, 9—disc, 10—first esterification reactor, 11—second esterification reactor, 12—first prepolymerization reactor, 13—second prepolymerization reactor, 14—high-viscosity PBAT polymerization reactor, 15—low-viscosity PET final polymerization reactor, 16—melt pump.

DETAILED DESCRIPTION OF EXEMPLARY EMBODIMENTS

The present disclosure is further explained in detail below in combination with specific embodiments; it should be understood that, those embodiments are to explain the basic principle, major features and advantages of the present disclosure, and the present disclosure is not limited by the scope of the following embodiments; the implementation conditions employed by the embodiments may be further adjusted according to particular requirements, and undefined implementation conditions usually are conditions in conventional experiments. In the following embodiments, unless otherwise specified, all raw materials are basically commercially available or prepared by conventional methods in the field.

The embodiments described above are only for illustrating the technical concepts and features of the present disclosure, and are intended to make a person familiar with the technology being able to understand the content of the present disclosure and thereby implement it, and should not limit the protective scope of this disclosure. Any equivalent variations or modifications according to the spirit of the present disclosure should be covered by the protective scope of the present disclosure.

The present disclosure will be further described in conjunction with the accompanying drawings and preferred embodiments of the present disclosure. In the following embodiments, it should be noted that terms such as orientations "front" and "rear" are based on the flow direction of the materials, with the directions in which the material flows first being the front and the direction in which it flows later being the rear. For example, in FIG. 1, the term "front" refers to the left side of FIG. 1, and the term "rear" refers to the right side of FIG. 1, similarly, in FIG. 2, the term "front" refers to the left side of FIG. 2, and the term "rear" refers to the right side of FIG. 2. Therefore, the orientation and positional relationship described in the present disclosure are only for the convenience of describing the disclosure and simplifying the description, and do not indicate or imply that the device or element referred to must have a specific orientation, only have a specific orientation, be constructed and operated in a specific orientation, and therefore cannot be understood as a limitation of the present disclosure.

Figure 1:
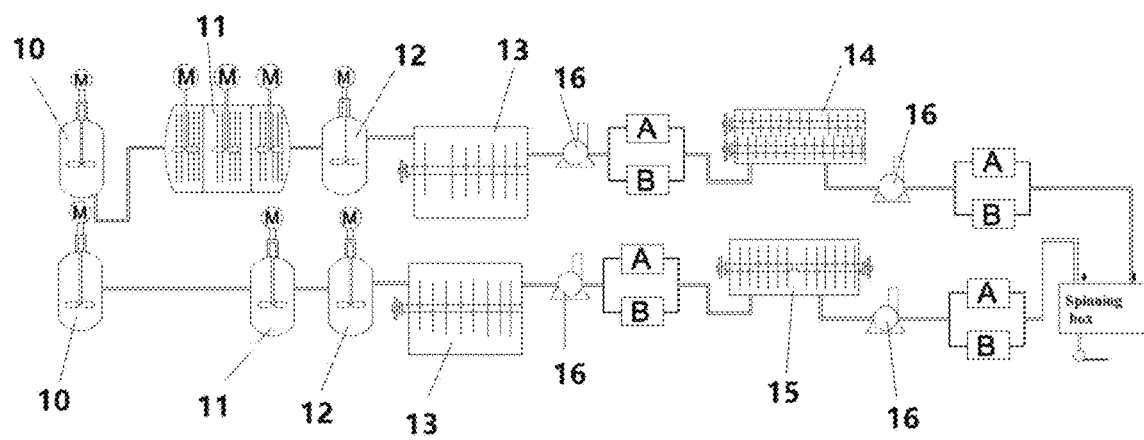
FIG. 1 is a schematic diagram of a polymerization system with two production lines used in an embodiment.

As shown in FIG. 1, the preparation of a high-viscosity PBAT/low-viscosity PET two-component elastic fiber in an embodiment uses two production lines. The first production line prepares the high-viscosity PBAT melt, as shown in the first row of FIG. 1, and this production line comprises a five-reactor system consisting of a first esterification reactor 10, a second esterification reactor 11, a first prepolymerization reactor 12, a second prepolymerization reactor 13, and a high-viscosity PBAT polymerization reactor 14. The five reactors are in communication through necessary pipelines, and necessary vacuum systems and the like are in communication with the five reactors. Wherein, a melt pump 16 and filters A and B are provided between the second prepolymerization reactor 13 and the high-viscosity PBAT polymerization reactor 14, and in the actual production process, the filters A and B are not turned on at the same time, for example, the filter A may be turned on first, and after the device runs for a period of time, the filter B can be switched to use, at this time, the filter A can be cleaned.

The second production line prepares the low-viscosity PET melt, as shown in the second row of FIG. 1, and this production line comprises another five-reactor system consisting of a first esterification reactor 10, a second esterification reactor 11, a first prepolymerization reactor 12, a second prepolymerization reactor 13, and a low-viscosity PET final polymerization reactor 15. The five reactors are in communication through necessary pipelines, and necessary vacuum systems and the like are in communication with the five reactors. The five reactors are in communication through necessary pipelines, and necessary vacuum systems and the like are in communication with the five reactors. Wherein, a melt pump 16 and filters A and B are provided between the second prepolymerization reactor 13 and the low-viscosity PET final polymerization reactor 15, and in the actual production process, the filters A and B are not turned on at the same time, for example, the filter A may be turned on first, and after the device runs for a period of time, the filter B can be switched to use, at this time, the filter A can be cleaned.

Figure 2:
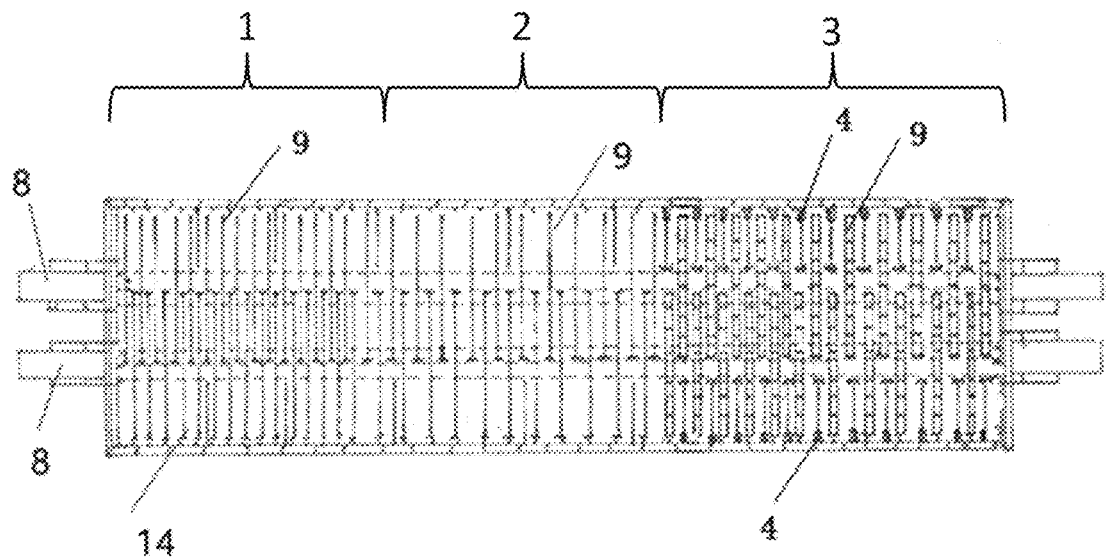
FIG. 2 is a schematic structural diagram of a high-viscosity PBAT polymerization reactor used in an embodiment.

For the high-viscosity PBAT polymerization reactor 14, as shown in FIG. 2, it is a horizontal polymerization reactor, and comprises a main body containing a chamber inside, the main body comprises a low viscosity zone 1, a med-high viscosity zone 2, and a high viscosity zone 3 disposed in sequence along the axial direction of the high-viscosity PBAT polymerization reactor, the viscosity of the PBAT melt in the low viscosity zone 1, the med-high viscosity zone 2 and the high viscosity zone 3 increases in sequence; the high-viscosity PBAT polymerization reactor 14 further comprises two agitating shafts 8 disposed in parallel in an axial direction and running through the low viscosity zone 1, the med-high viscosity zone 2 and the high viscosity zone 3, the rotation directions of the two agitating shafts 8 are opposite, a plurality of discs 9 is disposed on each of the agitating shafts 8, the circumference of the discs 9 are circular, and the distance between the two agitating shafts 8 is 1.05-1.10 times the radius of the discs, and the discs 9 on the two agitating shafts 8 partially overlap, in this way, it can ensure that the discs on the two parallel shafts intersect each other at the maximum area, forming efficient shear mixing.

The discs 9 in the low viscosity zone 1 are of a single-disc design (that is, each disc 9 is not fixed to adjacent discs 9, and arranged separately), the discs 9 in the med-high viscosity zone 2 are of a single-disc design, and the discs 9 in the high viscosity zone 3 are of a two-disc combination design, each two-disc combination comprises 8~12 spokes, in this way, it can adapt to the melt film pulling requirements under high dynamic viscosity conditions in the high viscosity zone. From the low viscosity zone 1 to the med-high viscosity zone 2 to the high viscosity zone 3, the spacing between two adjacent discs 9 increases successively; the spacing between two adjacent discs 9 in the high viscosity zone 3 is 60-100 mm. From front to rear along the axial direction of the high-viscosity PBAT polymerization reactor 14, the spacing between the disc combinations of the two-disc in the high viscosity zone 3 increases successively, and is controlled to 120-200 mm.

The total number of discs 9 in the low viscosity zone 1 and the med-high viscosity zone 2 is 35 to 55, the total number of discs 9 in the high viscosity zone 3 is 20 to 30. The lengths of the low viscosity zone 1, the med-high viscosity zone 2 and the high viscosity zone 3 are all one-third of the length of the high-viscosity PBAT polymerization reactor 14. The high-viscosity PBAT polymerization reactor 14 further comprises a prepolymer inlet located at the bottom of the front end of the low viscosity zone 1 and a high-viscosity PBAT melt outlet located at the bottom of the rear end of the high viscosity zone 3, wherein the high-viscosity PBAT melt outlet is in the shape of a trumpet-shaped.

Figure 3:
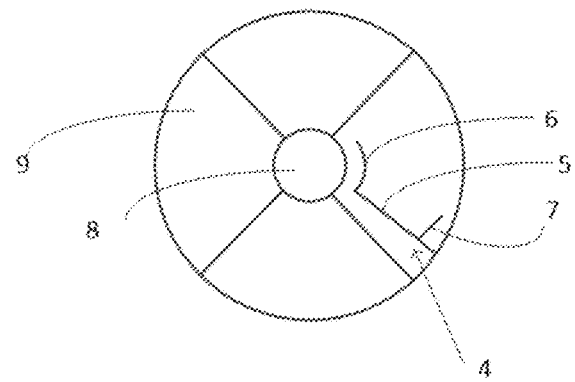
FIG. 3 is a schematic structural diagram of a composite scraper in the high viscosity zone of the high-viscosity PBAT polymerization reactor used in the embodiment.

As shown in FIG. 3, a composite scraper 4 is further provided in the high viscosity zone 3, the composite scraper 4 comprises an axial scraper 6 for scraping off the melt on the agitating shafts, a wall scraper 7 for scraping off the melt on the inner wall of the high-viscosity PBAT polymerization reactor 14, a disc scraper 5 for scraping off the melt on the discs, and a bottom scraper (not shown) for scraping off the melt on the bottom of the polymerization reactor, and the distance between the disc scrapers 5 and the discs 9 is 55-75 mm, in this way, it can ensure that the high-viscosity melt has a good feeding effect under efficient devolatilization conditions.

The first esterification reactor 10 and the second esterification reactor 11 used for preparing the high-viscosity PBAT melt are both provided with distillation columns at their upper ends. The high-viscosity PBAT polymerization reactor 14 further comprises a steam feed inlet for introducing superheated 1,4-butanediol steam at the top of the main body located in the rear end portion of the low viscosity zone 1, the rear end portion of the med-high viscosity zone 2 and the rear end portion of the high viscosity zone 3.

The high-viscosity PBAT polymerization reactor 14 is connected to a vacuum pump, and the vacuum pump is a liquid ring pump, with its inlet being provided with a chilled water device for cooling the gas. The melt pumps transport the high-viscosity PBAT melt and the low-viscosity PET melt, with their outlets being provided with melt coolers.

A dynamic mixer and a filter are arranged downstream of the high-viscosity PBAT polymerization reactor 14 and upstream of the same spinning assembly; a viscosity reducer injection system is arranged upstream of the dynamic mixer.

Necessary melt pumps, vacuum pumps, and conveying pipeline, etc. may be provided on the pipelines connecting the five reactors of the two production lines.

The same spinning assembly is a composite spinning box, and the high-viscosity PBAT polymerization reactor 14 is arranged at the top of the composite spinning box to shorten the conveying distance of the melt, especially the high-viscosity PBAT melt. The composite spinning box comprises a spinneret.

Embodiment 1

This embodiment provided a method for preparing a high-viscosity PBAT/low-viscosity PET two-component elastic fiber, which comprises specific steps of:

The method for preparing a polymerization catalyst used in this embodiment was as follows:

Tetrabutyl titanate was mixed with acetic acid to carry out an exothermic reaction, with a mass ratio of 1:1, after the reaction, a titanium tetraacetate complex and a large amount of n-butanol byproduct were generated, the reaction system was vacuum purified at 50° C. for 2.0 hours to remove the generated n-butanol, and cooled to room temperature, 1,4-butanediol was injected into the reaction system under agitating to prepare a 1,4-butanediol solution of the polymerization catalyst, the injection amount of 1,4-butanediol was controlled so that the content of titanium element in the polymerization catalyst solution was 1.0%.

A polymerization device using the two production lines mentioned above was used to synthesize the high-viscosity PBAT melt and the low-viscosity PET melt, respectively.

For the high-viscosity PBAT melt production line, the device comprises a pulping reactor, a first esterification reactor (with a distillation column at its upper end), a second esterification reactor (with a three-chamber structure, and a distillation column at its upper end), a first prepolymerization reactor, a second prepolymerization reactor, a high-viscosity PBAT polymerization reactor, and supporting vacuum systems and melt transport systems, as well as an esterification-prepolymerization system for synthesizing 1,4-butylene adipate prepolymer (PBA) not shown in FIG. 1, which can be a batch reactor, including an esterification stage and a prepolymerization stage.

For the low-viscosity PET melt production line, the device comprises a pulping reactor, a first esterification reactor, a second esterification reactor, a first prepolymerization reactor, a second prepolymerization reactor, a low-viscosity PET final polymerization reactor, and supporting vacuum systems and melt transport systems.

Synthesis of High-Viscosity PBAT Melt:

Purified terephthalic acid and 1,4-butanediol were sequentially subjected to a first esterification reaction in the first esterification reactor, and a second esterification reaction in the second esterification reactor, PBA of a number average molecular weight of 1800 was added to the third compartment from front to rear of the second esterification reactor before carrying out the second esterification reaction, PBA and the product of the first esterification reaction were subjected to the second esterification reaction and subsequent prepolymerization and polymerization, the reaction system was subjected to prepolymerization reactions in the first prepolymerization reactor and the second prepolymerization reactor to give a PBAT prepolymer, which was polymerized in the high-viscosity PBAT polymerization reactor to give a high-viscosity PBAT melt. The molar ratio of purified terephthalic acid to 1,4-butanediol was 1:1.25. The molar ratio of adipic acid monomer units in the 1,4-butylene adipate prepolymer to terephthalic acid is 45:55. The esterification temperature in the first esterification reactor was 245° C.~247° C., and the esterification was carried out at a pressure of 40~60 kPa (this pressure refers to the actual pressure in the first esterification reactor, which is lower than atmospheric pressure, that is, the reaction the first esterification reactor is in fact carried out under reduced pressure). The esterification temperature in the second esterification reactor was 248° C.~252° C., and the esterification was carried out under normal pressure. An esterification catalyst was added to the first esterification reactor: TOT catalyst (tetra (2-ethylhexoxy) titanate) produced by Nippon Soda Co., Ltd., with a usage amount such that the mass of titanium element in it was 30 ppm of the mass of the melt. The polymerization catalyst prepared above was introduced into the bottom of the first prepolymerization reactor, with a usage amount such that the mass of titanium element in it was 70 ppm of the mass of the melt. The reaction temperature in the first prepolymerization reactor was 250~252° C., and the vacuum degree was 9.9 kPa; the reaction temperature in the second prepolymerization reactor was 251~252° C., and the vacuum degree was 1.05 kPa; the temperature at the melt outlet of the high-viscosity PBAT polymerization reactor was 252.0° C., and the vacuum degree in the high-viscosity PBAT polymerization reactor was 135 Pa. The steam feed inlet of the high-viscosity PBAT polymerization reactor was sprayed with superheated 1,4-butanediol through a steam jet pump, and for the large amount of tetrahydrofuran generated during the polymerization process, it was accurately separated by a large-capacity chilled water plate exchanger arranged before the vacuum liquid ring pump. The high-viscosity PBAT melt discharged ultimately from the melt outlet of the high-viscosity PBAT polymerization reactor had an intrinsic viscosity of 1.198, and a dynamic viscosity of 615 Pa·s, where the intrinsic viscosity was determined at 25° C. in a mixed solvent of phenol and tetrachloroethane in a volume ratio of 3:2. The dynamic viscosity was measured at 252° C.

Synthesis of Low-Viscosity PET Melt:

Purified terephthalic acid and ethylene glycol were sequentially subjected to esterification reactions in the first esterification reactor and the second esterification reactor, and prepolymerization reactions in the first prepolymerization reactor and the second prepolymerization reactor to give a PET prepolymer, which was polymerized in the low-viscosity PET final polymerization reactor to give a low-viscosity PET melt. Both the catalysts for esterification and polymerization were ethylene glycol antimony, and its usage amount was such that the mass of antimony element in it was 210 ppm of the total mass of the PET melt, and this catalyst was added to the reaction system in the first esterification reactor. The first esterification reactor was for esterification under pressurization, and the second esterification reactor was for esterification at atmospheric pressure. By adjusting the reaction conditions (including the vacuum degree of the low-viscosity PET final polymerization reactor, the agitating rate of the low-viscosity PET final polymerization reactor, the polymerization temperature of the low-viscosity PET final polymerization reactor, etc., the vacuum degree was controlled at 160~200 Pa, the agitating rate was 3.5~5.5 rpm in the low viscosity zone (front chamber), and 2.0~3.5 rpm in the med-high viscosity zone and high viscosity zone (rear chamber); the polymerization temperature ranged from 272 to 275° C.), the resulting low-viscosity PET melt had an intrinsic viscosity of 0.452, and a dynamic viscosity of 90 Pa·s. The intrinsic viscosity was measured at 25° C. in a mixed solvent of phenol and tetrachloroethane in a volume ratio of 3:2. The dynamic viscosity was measured at 275° C.

Spinning:

Finally, the high-viscosity PBAT melt and the low-viscosity PET melt were transported through the melt transport in a mass ratio of 5:5 to the composite spinning box, and then spun through the composite spinning spinneret to obtain a high-viscosity PBAT/low-viscosity PET two-component elastic fiber.

Wherein, the parameters of reaction conditions, high-viscosity PBAT melt, and low-viscosity PET melt are shown in Tables 1-5. Wherein, '-' indicates none.

Embodiments 2-13

Embodiments 2-13 provided methods for preparing a high-viscosity PBAT/low-viscosity PET two-component elastic fiber, where the specific steps were basically the same as in Embodiment 1, by differing in that when synthesizing the high-viscosity PBAT melt, the parameters of the high-viscosity PBAT melt were adjusted by adjusting the reaction conditions (including the vacuum degree of the high-viscosity PBAT polymerization reactor, the agitating rate in the low viscosity zone, the agitating rate in the med-high viscosity zone and the high viscosity zone, the inlet temperature of the PBAT prepolymer melt (PBAT low-viscosity melt), and the residence time of material in the polymerization reactor, etc.); when synthesizing the low-viscosity PET melt, the parameters of the low-viscosity PET melt were adjusted by adjusting the reaction conditions (including the vacuum degree of the low-viscosity PET final polymerization reactor, the agitating rate in the low-viscosity PET final polymerization reactor, and the polymerization temperature in the low-viscosity PET final polymerization reactor). And during polymerization, a side reaction inhibitor, a Lewis base: triethanolamine, which accounts for 160 ppm of the mass of the high-viscosity PBAT melt, was introduced into the first compartment from front to rear of the second esterification reactor. Wherein, the parameters of reaction conditions, high-viscosity PBAT melt, and low-viscosity PET melt are shown in Tables 1-5.

Embodiment 14

Embodiment 14 provided a method for preparing a high-viscosity PBAT/low-viscosity PET two-component elastic fiber, where the specific steps were basically the same as in Embodiment 1, by differing in that when synthesizing the high-viscosity PBAT melt, the parameters of the high-viscosity PBAT melt were adjusted by adjusting the reaction conditions (including the vacuum degree of the high-viscosity PBAT polymerization reactor, the agitating rate in the low viscosity zone, the agitating rate in the med-high viscosity zone and the high viscosity zone, the inlet temperature of the PBAT prepolymer melt (PBAT low-viscosity melt), and the residence time of material in the polymerization reactor, etc.); when synthesizing the low-viscosity PET melt, the parameters of the low-viscosity PET melt were adjusted by adjusting the reaction conditions (including the vacuum degree of the low-viscosity PET final polymerization reactor, the agitating rate in the low-viscosity PET final polymerization reactor, and the polymerization temperature in the low-viscosity PET final polymerization reactor). And during polymerization, a side reaction inhibitor, a Lewis base: triethanolamine, which accounts for 160 ppm of the mass of the high-viscosity PBAT melt, was introduced into the first compartment from front to rear of the second esterification reactor. And during polymerization, a side reaction inhibitor, a Lewis base: triethanolamine, which accounts for 160 ppm of the mass of the high-viscosity PBAT melt, was introduced into the first compartment from front to rear of the second esterification reactor. In addition, a viscosity reducer was injected into the system, specifically an amorphous polyester with an intrinsic viscosity of 0.55 (measured at 25° C. using phenol: tetrachloroethylene (in a volume ratio of 3:2)), with a usage amount of 0.5% of the total mass of the melt. Wherein, the parameters of reaction conditions, high-viscosity PBAT melt, and low-viscosity PET melt are shown in Tables 1-5.

Embodiment 15

Embodiment 15 provided a method for preparing a high-viscosity PBAT/low-viscosity PET two-component elastic fiber, where the specific steps were basically the same as in Embodiment 1, by differing in that when synthesizing the high-viscosity PBAT melt, the parameters of the high-viscosity PBAT melt were adjusted by adjusting the reaction conditions (including the vacuum degree of the high-viscosity PBAT polymerization reactor, the agitating rate in the low viscosity zone, the agitating rate in the med-high viscosity zone and the high viscosity zone, the inlet temperature of the PBAT prepolymer melt (PBAT low-viscosity melt), and the residence time of material in the polymerization reactor, etc.); when synthesizing the low-viscosity PET melt, the parameters of the low-viscosity PET melt were adjusted by adjusting the reaction conditions (including the vacuum degree of the low-viscosity PET final polymerization reactor, the agitating rate in the low-viscosity PET final polymerization reactor, and the polymerization temperature in the low-viscosity PET final polymerization reactor). And during polymerization, a side reaction inhibitor, a Lewis base: triethanolamine, which accounts for 160 ppm of the mass of the high-viscosity PBAT melt, was introduced into the first compartment from front to rear of the second esterification reactor. And during polymerization, a side reaction inhibitor, a Lewis base: triethanolamine, which accounts for 160 ppm of the mass of the high-viscosity PBAT melt, was introduced into the first compartment from front to rear of the second esterification reactor. In addition, a viscosity reducer was injected into the system, specifically an amorphous polyester with an intrinsic viscosity of 0.58 (measured at 25° C. using phenol: tetrachloroethylene (in a volume ratio of 3:2)), with a usage amount of 0.8% of the total mass of the melt. Wherein, the parameters of reaction conditions, high-viscosity PBAT melt, and low-viscosity PET melt are shown in Tables 1-5.

Comparative Example 1

This comparative example 1 provided a method for preparing a direct melt-spun high-viscosity PET/low-viscosity PET two-component elastic fiber. This preparation method adopted a six-reactor system consisting of a first esterification reactor, a second esterification reactor, a first prepolymerization reactor and a second prepolymerization reactor connected successively, and a high viscosity final polymerization reactor and a low viscosity final polymerization reactor respectively connected to the second prepolymerization reactor. The high-viscosity PET melt obtained in the high viscosity final polymerization reactor and the low-viscosity PET obtained in the low viscosity final polymerization reactor were simultaneously transported through melt transport to the same spinning assembly for parallel spinning. Wherein, the second esterification reactor was provided with three compartments.

In particular, terephthalic acid, ethylene glycol and a catalyst ethylene glycol antimony were sequentially subjected to esterification reactions in the first esterification reactor and the second esterification reactor, and prepolymerization reactions in the first prepolymerization reactor and the second prepolymerization reactor to give an ethylene terephthalate prepolymer, and before the second esterification reaction in the first esterification reactor, an ordinary titanium dioxide matting agent color paste (prepared by grinding and dispersing titanium dioxide and ethylene glycol, with titanium dioxide accounting for 10 wt % and ethylene glycol accounting for 90 wt %) was added into one compartment of the second esterification reactor through corresponding pipelines. Wherein, the molar ratio of terephthalic acid to ethylene glycol was 1:1.25, and the usage amount of catalyst mentioned above was 210 ppm of antimony element in the total mass of the melt; the usage amount of matting agent was such that titanium dioxide accounted for 0.3% of the total mass of the melt. The ethylene terephthalate prepolyme was then introduced into the high viscosity final polymerization reactor and the low viscosity final polymerization reactor for polymerization, to give a high-viscosity PET melt and a low-viscosity PET melt; finally, the high-viscosity PET melt and the low-viscosity PET melt were directly introduced in a mass ratio of 5:5 to the same parallel composite spinning box for spinning, to obtain a PET two-component elastic fiber. Wherein, the parameters of the high-viscosity PET melt and the low-viscosity PET melt are shown in Tables 3-5.

Comparative Example 2

This comparative example 2 provided a method for preparing a chip-spun high-viscosity PTT/low-viscosity PET two-component elastic fiber. In particular, a high-viscosity PTT melt chip and a low-viscosity PET melt chip were pre-crystallized and dry screw melted, the two melts were then directly introduced in a mass ratio of 5:5 to the same parallel composite spinning box for spinning, to obtain a chip-spun two-component elastic fiber. The properties of the corresponding chips are shown in Tables 3-5. Wherein, the high-viscosity PTT chip and the low-viscosity PET chip were both obtained commercially, both containing no matting agents.

Comparative Example 3

This comparative example 3 provided a method for preparing a chip-spun high-viscosity EDDP (disperse atmospheric metachromatic polyester)/low-viscosity PET two-component elastic fiber. In particular, a high-viscosity EDDP melt chip and a low-viscosity PET melt chip were pre-crystallized and dry screw melted, and the two melts were then directly introduced in a mass ratio of 5:5 to the same parallel composite spinning box for spinning, to obtain a chip-spun two-component elastic fiber. The properties of the corresponding chips are shown in Tables 3-5. The properties of the corresponding chips are shown in Tables 3-5.

TABLE 1

Test indicators for high-viscosity PBAT polyester esterification materials

| PBAT production line | Acid value (mg KOH/g) | | Agglomerated particles (5~10 μm)/mg | | Esterification rate | |
|---|---|---|---|---|---|---|
| | First esterification reactor | Second esterification reactor | First esterification reactor | Second esterification reactor | First esterification reactor | Second esterification reactor |
| Embodiment 1 | 39.50 | 16.93 | — | 0.04 | 92.4% | 97.6% |
| Embodiment 2 | 38.55 | 16.90 | — | 0.02 | 92.2% | 97.4% |
| Embodiment 3 | 39.52 | 16.82 | — | 0.02 | 92.7% | 97.6% |
| Embodiment 4 | 39.18 | 16.55 | — | 0.02 | 92.5% | 97.3% |
| Embodiment 5 | 40.56 | 15.98 | — | 0.03 | 92.2% | 98.0% |
| Embodiment 6 | 39.39 | 16.75 | — | 0.01 | 93.5% | 98.2% |
| Embodiment 7 | 39.61 | 16.84 | — | 0.00 | 93.8% | 98.3% |
| Embodiment 8 | 38.49 | 16.58 | — | 0.03 | 92.6% | 98.0% |
| Embodiment 9 | 39.15 | 16.53 | — | 0.02 | 93.2% | 98.3% |
| Embodiment 10 | 39.67 | 16.33 | — | 0.02 | 92.5% | 98.4% |
| Embodiment 11 | 39.52 | 15.85 | — | 0.00 | 92.7% | 98.2% |
| Embodiment 12 | 39.77 | 15.90 | — | 0.03 | 93.5% | 98.3% |
| Embodiment 13 | 38.28 | 16.25 | — | 0.04 | 92.7% | 98.0% |

TABLE 1-continued

Test indicators for high-viscosity PBAT polyester esterification materials

| PBAT production line | Acid value (mg KOH/g) | | Agglomerated particles (5~10 μm)/mg | | Esterification rate | |
|---|---|---|---|---|---|---|
| | First esterification reactor | Second esterification reactor | First esterification reactor | Second esterification reactor | First esterification reactor | Second esterification reactor |
| Embodiment 14 | 39.65 | 15.87 | — | 0.02 | 93.1% | 98.1% |
| Embodiment 15 | 39.34 | 16.20 | — | 0.02 | 92.3% | 97.5% |

TABLE 2

Test indicators for materials in the high-viscosity PBAT second prepolymerization reactor

| | Prepolymer intrinsic viscosity (IV) | Agglomerated particles (5~10 μm)/mg |
|---|---|---|
| Embodiment 1 | 0.350 | 0.18 |
| Embodiment 2 | 0.352 | 0.16 |
| Embodiment 3 | 0.350 | 0.15 |
| Embodiment 4 | 0.346 | 0.09 |
| Embodiment 5 | 0.349 | 0.16 |
| Embodiment 6 | 0.352 | 0.21 |
| Embodiment 7 | 0.349 | 0.17 |
| Embodiment 8 | 0.345 | 0.18 |
| Embodiment 9 | 0.349 | 0.11 |
| Embodiment 10 | 0.346 | 0.04 |
| Embodiment 11 | 0.343 | 0.04 |
| Embodiment 12 | 0.347 | 0.06 |
| Embodiment 13 | 0.344 | 0.01 |
| Embodiment 14 | 0.342 | 0.05 |
| Embodiment 15 | 0.339 | 0.04 |

Note
The intrinsic viscosity was measured at 25° C. using a mixed solvent of phenol and tetrachloroethane (3:2).

TABLE 3

Test indicators for high-viscosity PBAT polyester chips

| | Intrinsic viscosity | Titanium dioxide | Carboxyl terminal group | Agglomerated particles | | Moisture | Melting point | Hue | | Ash | Ferrum content |
|---|---|---|---|---|---|---|---|---|---|---|---|
| | | | | ≤10 μm | 5~10 μm | | | L value | B value | | |
| Unit | dl/g | % | mol/t | /mg | /mg | % | ° C. | — | — | % | % |
| Embodiment 1 | 1.198 | — | 16.3 | 0.00 | 0.02 | 0.24 | 126.2 | 86.7 | 3.99 | 0.03 | — |
| Embodiment 2 | 1.201 | — | 14.9 | 0.00 | 0.01 | 0.23 | 128.3 | 86.4 | 4.05 | 0.03 | — |
| Embodiment 3 | 1.199 | — | 14.6 | 0.00 | 0.02 | 0.25 | 128.4 | 85.5 | 4.13 | 0.03 | — |
| Embodiment 4 | 1.197 | — | 14.8 | 0.00 | 0.02 | 0.25 | 128.3 | 85.8 | 3.96 | 0.02 | — |
| Embodiment 5 | 1.202 | — | 14.2 | 0.00 | 0.03 | 0.24 | 127.8 | 87.2 | 4.02 | 0.03 | — |
| Embodiment 6 | 1.201 | — | 14.5 | 0.00 | 0.02 | 0.23 | 128.6 | 86.7 | 3.65 | 0.02 | — |
| Embodiment 7 | 1.199 | — | 14.3 | 0.00 | 0.02 | 0.26 | 128.5 | 87.3 | 3.86 | 0.03 | — |
| Embodiment 8 | 1.052 | — | 15.8 | 0.00 | 0.04 | 0.22 | 130.3 | 86.8 | 4.08 | 0.02 | — |
| Embodiment 9 | 1.101 | — | 15.5 | 0.00 | 0.03 | 0.25 | 130.0 | 87.3 | 4.46 | 0.02 | — |
| Embodiment 10 | 1.142 | — | 15.2 | 0.00 | 0.01 | 0.23 | 129.3 | 86.3 | 4.69 | 0.02 | — |
| Embodiment 11 | 1.179 | — | 14.9 | 0.00 | 0.03 | 0.22 | 128.2 | 87.2 | 4.98 | 0.03 | — |
| Embodiment 12 | 1.251 | — | 14.2 | 0.00 | 0.03 | 0.25 | 128.5 | 86.5 | 5.45 | 0.02 | — |
| Embodiment 13 | 1.302 | — | 13.9 | 0.00 | 0.02 | 0.26 | 127.6 | 86.5 | 5.72 | 0.03 | — |
| Embodiment 14 (0.5% viscosity reducer added) | 1.202 | — | 14.2 | 0.00 | 0.03 | 0.23 | 128.3 | 87.3 | 4.22 | 0.03 | — |
| Embodiment 15 (0.8% viscosity reducer added) | 1.200 | — | 14.6 | 0.00 | 0.01 | 0.24 | 128.5 | 80.9 | 4.70 | 0.02 | — |
| Comparative example 1 (PET/PET) | 0.731 | 0.30 | 23.8 | 0.00 | 0.00 | 0.16 | 258.6 | 82.7 | 4.62 | 0.00 | — |

TABLE 3-continued

Test indicators for high-viscosity PBAT polyester chips

| | Intrinsic viscosity | Titanium dioxide | Carboxyl terminal group | Agglomerated particles | | | Melting point | Hue | | Ash | Ferrum content |
| | | | | ≤10 μm | 5~10 μm | Moisture | | L value | B value | | |
| Unit | dl/g | % | mol/t | /mg | /mg | % | ° C. | — | — | % | % |
| Comparative example 2 (PTT/PET) | 1.050 | 0.32 | 11.6 | 0.02 | 0.03 | 0.12 | 228.8 | 88.4 | 6.05 | 0.04 | — |
| Comparative example 3 (EDDP/PET) | 0.803 | 0.30 | 22.7 | 0.00 | 0.01 | 0.25 | 246.5 | 80.6 | 6.27 | 0.01 | — |

Note:
The intrinsic viscosity was measured at 25° C. using a mixed solvent of phenol and tetrachloroethane (3:2); in Comparative example 1, the chip refers to the high-viscosity PET chip; in Comparative example 2, the chip refers to the high-viscosity PTT chip; in Comparative example 3, the chip refers to the high-viscosity EDDP chip.

TABLE 4

Physical and chemical indicators of low-viscosity PET polyester chips

| | Intrinsic viscosity | Titanium dioxide | Carboxyl terminal group | Agglomerated particles | | | Melting point | Hue | | Ash | Ferrum content |
| | | | | ≤10 μm | 5~10 μm | Moisture | | L value | B value | | |
| Unit | dl/g | % | mol/t | /mg | /mg | % | ° C. | — | — | % | % |
| Embodiment 1 | 0.452 | — | 28.1 | 0.00 | 0.00 | 0.17 | 259.1 | 84.3 | 2.99 | 0.00 | — |
| Embodiment 2 | 0.450 | — | 27.8 | 0.00 | 0.00 | 0.16 | 259.4 | 84.8 | 3.25 | 0.01 | — |
| Embodiment 3 | 0.472 | — | 27.5 | 0.00 | 0.00 | 0.18 | 258.6 | 83.7 | 3.09 | 0.00 | — |
| Embodiment 4 | 0.490 | — | 27.3 | 0.00 | 0.00 | 0.14 | 259.0 | 83.9 | 3.16 | 0.00 | — |
| Embodiment 5 | 0.512 | — | 27.6 | 0.00 | 0.00 | 0.19 | 259.3 | 84.0 | 3.28 | 0.00 | — |
| Embodiment 6 | 0.531 | — | 27.8 | 0.00 | 0.00 | 0.15 | 258.2 | 84.5 | 3.35 | 0.02 | — |
| Embodiment 7 | 0.552 | — | 27.2 | 0.00 | 0.00 | 0.16 | 258.2 | 83.8 | 3.31 | 0.00 | — |
| Embodiment 8 | 0.550 | — | 27.2 | 0.00 | 0.00 | 0.18 | 259.6 | 84.6 | 3.28 | 0.02 | — |
| Embodiment 9 | 0.551 | — | 27.5 | 0.00 | 0.00 | 0.14 | 259.3 | 84.3 | 3.13 | 0.00 | — |
| Embodiment 10 | 0.548 | — | 27.3 | 0.00 | 0.00 | 0.16 | 258.6 | 84.1 | 3.39 | 0.01 | — |
| Embodiment 11 | 0.553 | — | 28.0 | 0.00 | 0.00 | 0.15 | 259.0 | 84.5 | 3.25 | 0.00 | — |
| Embodiment 12 | 0.549 | — | 28.2 | 0.00 | 0.00 | 0.17 | 259.4 | 83.7 | 2.99 | 0.00 | — |
| Embodiment 13 | 0.550 | — | 27.3 | 0.00 | 0.00 | 0.17 | 258.7 | 84.3 | 3.17 | 0.00 | — |
| Embodiment 14 (0.5% viscosity reducer added) | 0.552 | — | 27.5 | 0.00 | 0.00 | 0.16 | 259.3 | 84.1 | 3.25 | 0.02 | — |
| Embodiment 15 (0.8% viscosity reducer added) | 0.550 | — | 27.7 | 0.00 | 0.00 | 0.19 | 259.3 | 83.5 | 2.84 | 0.00 | — |
| Comparative example 1 | 0.473 | 0.30 | 28.2 | 0.00 | 0.00 | 0.16 | 259.5 | 84.8 | 2.99 | 0.01 | — |
| Comparative example 2 | 0.551 | 0.32 | 28.3 | 0.00 | 0.00 | 0.15 | 259.0 | 84.2 | 3.34 | 0.01 | — |
| Comparative example 3 | 0.473 | 0.31 | 29.0 | 0.00 | 0.00 | 0.16 | 259.7 | 84.5 | 3.18 | 0.00 | — |

Note:
The intrinsic viscosity was measured at 25° C. using a mixed solvent of phenol and tetrachloroethane (3:2).

TABLE 5

Control data of high-viscosity PBAT polymerization reactor and related indicators of high-viscosity PBAT and low-viscosity PET

| No. | Vacuum degree in polymerization reactor/Pa | Temperature at low viscosity PBAT melt inlet/° C. | Temperature at high-viscosity melt outlet/° C. | Intrinsic viscosity at high viscosity PBAT melt outlet | Viscosity of low viscosity PET melt | Viscosity difference between high viscosity PBAT melt and low viscosity PET melt |
|---|---|---|---|---|---|---|
| Embodiment 1 | 135.0 | 248.0 | 252.0 | 1.198 | 0.452 | 0.746 |
| Embodiment 2 | 134.6 | 248.2 | 252.1 | 1.201 | 0.450 | 0.751 |
| Embodiment 3 | 134.3 | 248.0 | 252.2 | 1.199 | 0.472 | 0.727 |
| Embodiment 4 | 134.6 | 248.0 | 252.3 | 1.197 | 0.490 | 0.707 |
| Embodiment 5 | 134.8 | 248.2 | 252.1 | 1.202 | 0.512 | 0.690 |
| Embodiment 6 | 135.5 | 248.4 | 252.2 | 1.201 | 0.531 | 0.670 |
| Embodiment 7 | 133.7 | 248.2 | 252.4 | 1.199 | 0.552 | 0.647 |
| Embodiment 8 | 148.2 | 248.0 | 252.2 | 1.052 | 0.550 | 0.502 |
| Embodiment 9 | 146.9 | 248.3 | 252.5 | 1.101 | 0.551 | 0.550 |
| Embodiment 10 | 144.6 | 248.2 | 252.3 | 1.142 | 0.548 | 0.594 |
| Embodiment 11 | 137.5 | 248.5 | 252.2 | 1.179 | 0.553 | 0.626 |
| Embodiment 12 | 132.3 | 248.3 | 252.6 | 1.251 | 0.549 | 0.702 |
| Embodiment 13 | 126.7 | 247.9 | 252.4 | 1.302 | 0.550 | 0.752 |
| Embodiment 14 | 134.4 | 248.3 | 252.5 | 1.202 | 0.552 | 0.650 |
| Embodiment 15 | 132.9 | 248.1 | 252.2 | 1.200 | 0.550 | 0.650 |
| Comparative example 1 | 158.5 | 279.3 | 284.5 | 0.731 | 0.473 | 0.258 |
| Comparative example 2 (purchased chip) | Not involved | Not involved | Not involved | 1.050 | 0.551 | 0.499 |
| Comparative example 3 | Not involved | Not involved | Not involved | 0.803 | 0.473 | 0.330 |

The properties of the composite elastic fibers obtained by spinning the high-viscosity melt and the low-viscosity PET melt corresponding to Embodiments 1-15 and Comparative Examples 1-3 are shown in Table 6, where the fiber variety is FDY and the specification is 83 dtex/36f.

TABLE 6

Physical and chemical indicators of PBAT/PET two-component composite elastic fibers

| No. | Specification | Linear density/dtex | Strength/cN/dtex | Elongation/% | Oil content/% | Evenness CV/% | Boiling water shrinkage rate/% | Crimp shrinkage rate/% | Interlacing point |
|---|---|---|---|---|---|---|---|---|---|
| Embodiment 1 | 83/36 | 83.3 | 2.62 | 35.72 | 1.35 | 1.56 | 12.48 | 45.5 | 4 |
| Embodiment 2 | 83/36 | 82.5 | 2.65 | 34.81 | 1.37 | 1.53 | 12.35 | 45.8 | 4 |
| Embodiment 3 | 83/36 | 83.2 | 2.70 | 34.50 | 1.31 | 1.52 | 12.29 | 43.1 | 4 |
| Embodiment 4 | 83/36 | 82.6 | 2.72 | 34.19 | 1.34 | 1.55 | 12.22 | 41.2 | 4 |
| Embodiment 5 | 83/36 | 82.6 | 2.78 | 32.65 | 1.39 | 1.53 | 12.14 | 39.5 | 4 |

TABLE 6-continued

Physical and chemical indicators of PBAT/PET two-component composite elastic fibers

| No. | Specification | Linear density/ dtex | Strength/ cN/dtex | Elongation/ % | Oil content/ % | Evenness CV/% | Boiling water shrinkage rate/% | Crimp shrinkage rate/% | Interlacing point |
|---|---|---|---|---|---|---|---|---|---|
| Embodiment 6 | 83/36 | 82.5 | 2.80 | 31.90 | 1.33 | 1.55 | 12.11 | 38.4 | 4 |
| Embodiment 7 | 83/36 | 83.3 | 2.82 | 31.35 | 1.38 | 1.53 | 12.27 | 35.6 | 4 |
| Embodiment 8 | 83/36 | 82.7 | 2.54 | 37.19 | 1.33 | 1.51 | 12.15 | 25.3 | 4 |
| Embodiment 9 | 83/36 | 83.0 | 2.59 | 36.70 | 1.34 | 1.55 | 12.23 | 28.7 | 4 |
| Embodiment 10 | 83/36 | 83.1 | 2.63 | 35.52 | 1.36 | 1.53 | 12.36 | 29.9 | 5 |
| Embodiment 11 | 83/36 | 83.3 | 2.72 | 33.47 | 1.35 | 1.51 | 12.20 | 31.8 | 4 |
| Embodiment 12 | 83/36 | 82.7 | 2.81 | 31.08 | 1.35 | 1.54 | 12.04 | 40.6 | 4 |
| Embodiment 13 | 83/36 | 83.5 | 2.98 | 29.86 | 1.32 | 1.52 | 11.97 | 47.7 | 5 |
| Embodiment 14 | 83/36 | 83.4 | 2.86 | 31.55 | 1.37 | 1.51 | 12.15 | 37.7 | 4 |
| Embodiment 15 | 83/36 | 83.2 | 2.88 | 31.59 | 1.34 | 1.53 | 13.03 | 37.9 | 4 |
| Comparative example 1 | 83/36 | 82.9 | 2.89 | 26.88 | 1.32 | 1.19 | 13.52 | 26.5 | 4 |
| Comparative example 2 | 83/36 | 82.8 | 3.05 | 30.03 | 1.45 | 1.34 | 18.08 | 62.6 | 4 |
| Comparative example 3 | 83/36 | 83.1 | 2.68 | 29.55 | 1.40 | 1.42 | 16.54 | 30.3 | 4 |

It can be seen that the present disclosure utilizes two different polyester production lines to produce a high-viscosity PBAT polyester and a low-viscosity PET polyester, respectively, the two melts of different viscosities are then transported to the same parallel composite spinning assembly through melt transport, after which the high-viscosity PBAT/low-viscosity PET two-component elastic fiber is prepared, achieving the preparation of direct melt-spun high-viscosity PBAT/low-viscosity PET parallel elastic fiber, the obtained fiber has excellent performance.

The embodiments described above are only for illustrating the technical concepts and features of the present disclosure, and are intended to make a person familiar with the technology being able to understand the content of the present disclosure and thereby implement it, and should not limit the protective scope of this disclosure. Any equivalent variations or modifications according to the spirit of the present disclosure should be covered by the protective scope of the present disclosure.

What is claimed is:

1. A method for preparing a high-viscosity PBAT/low-viscosity PET two-component elastic fiber, the two-component elastic fiber containing a high-viscosity PBAT component and a low-viscosity PET component, the viscosity of the high-viscosity PBAT component being greater than that of the low-viscosity PET component, wherein, the preparation method comprises steps of preparing a high-viscosity PBAT melt and a low-viscosity PET melt separately, and spinning the high-viscosity PBAT melt and the low-viscosity PET melt through the same parallel composite spinning assembly to obtain the two-component elastic fiber; the viscosity of the high-viscosity PBAT melt is greater than the viscosity of the low-viscosity PET melt; the step of preparing a high-viscosity PBAT melt comprises a step of sequentially passing terephthalic acid and 1,4-butanediol through a first esterification reactor for a first esterification reaction, through a second esterification reactor for a second esterification reaction, through a first prepolymerization reactor and a second prepolymerization reactor for prepolymerization reactions to give a PBAT prepolymer, a step of adding a 1,4-butylene adipate prepolymer to the second esterification reactor when carrying out the second esterification reaction, and a step of polymerizing the PBAT prepolymer in a high-viscosity PBAT polymerization reactor to obtain the high-viscosity PBAT melt, the high-viscosity PBAT polymerization reactor is a horizontal polymerization reactor, and comprises a main body containing a chamber inside, the main body comprises a low viscosity zone, a med-high viscosity zone, and a high viscosity zone disposed in sequence along the axial direction of the high-viscosity PBAT polymerization reactor, the viscosity of the PBAT melt in the low viscosity zone, the med-high viscosity zone and the high viscosity zone increases in sequence; the high-viscosity PBAT polymerization reactor further comprises two agitating shafts disposed in parallel in an axial direction and running through the low viscosity zone, the med-high viscosity zone and the high viscosity zone, the rotation directions of the two agitating shafts are opposite, each of the agitating shafts is provided with a plurality of discs, the circumference of the discs are circular, and the distance between the two agitating shafts is 1.05-1.10 times the radius of the discs, and the discs on the two agitating shafts partially overlap; the step of preparing low-viscosity PET melt comprises a step of sequentially passing terephthalic acid and ethylene glycol through a first esterification reactor and a second esterification reactor for esterification reactions, through a first prepolymerization reactor and a second prepolymerization reactor for prepolymerization reactions to give a PET prepolymer, and a step of polymerizing the PET prepolymer in a low-viscosity PET final polymerization reactor to obtain the low-viscosity PET melt.

2. The preparation method according to claim 1, wherein, the discs in the low viscosity zone are of a single-disc design, the discs in the med-high viscosity zone are of a single-disc design, the discs in the high viscosity zone are of a two-disc combination design, and each two-disc combination is provided with 8~12 spokes.

3. The preparation method according to claim 1, wherein, from the low viscosity zone to the med-high viscosity zone to the high viscosity zone, the spacing between two adjacent discs increases successively; the spacing between two adjacent discs in the high viscosity zone is 60-100 mm; and/or, from front to rear along the axial direction of the high-viscosity PBAT polymerization reactor, the spacing between the disc combinations of the two-disc combination design in the high viscosity zone increases successively, and is controlled to 120-200 mm.

4. The preparation method according to claim 1, wherein, the total number of discs in the low viscosity zone and the med-high viscosity zone is 35 to 55, the total number of discs in the high viscosity zone is 20 to 30; and/or, the lengths of the low viscosity zone, the med-high viscosity zone and the high viscosity zone are all one-third of the length of the high-viscosity PBAT polymerization reactor; and/or, the high-viscosity PBAT polymerization reactor further comprises a prepolymer inlet located at the bottom of the front end of the low viscosity zone and a high-viscosity PBAT melt outlet located at the bottom of the rear end of the high viscosity zone, wherein the high-viscosity PBAT melt outlet is in the shape of a trumpet-shaped.

5. The preparation method according to claim 1, wherein, a composite scraper is further provided at two sides of the high viscosity zone between the two-disc combinations, the composite scraper comprises an axial scraper for scraping off the melt on the agitating shafts, a wall scraper for scraping off the melt on the inner wall of the high-viscosity PBAT polymerization reactor, a disc scraper for scraping off the melt on the discs, and a bottom scraper for scraping off the melt on the bottom of the polymerization reactor, and the distance between the disc scrapers and the discs is 55-75 mm.

6. The preparation method according to claim 1, wherein, in percent by weight, the two-component elastic fiber contains 30%-70% of high-viscosity PBAT component and 70%-30% of low-viscosity PET component; and/or, the high-viscosity PBAT melt has an intrinsic viscosity of 1.05~1.30 at 25° C., and a dynamic viscosity of 315~905 Pa·s at 252° C.; the low-viscosity PET melt has an intrinsic viscosity of 0.45~0.55 at 25° C., and a dynamic viscosity of 90~240 Pa·s at 275° C.

7. The preparation method according to claim 1, wherein, the number average molecular weight of the 1,4-butylene adipate prepolymer is between 1,600 and 2,500; and/or, the 1,4-butylene adipate prepolymer is prepared by esterification and prepolymerization of adipic acid and 1,4-butanediol; and/or, the molar ratio of adipic acid monomer units in the 1,4-butylene adipate prepolymer to the terephthalic acid is (45-55):(45-55).

8. The preparation method according to claim 7, wherein, the esterification and prepolymerization of adipic acid and 1,4-butanediol are carried out in the presence of a proton acid catalyst.

9. The preparation method according to claim 1, wherein, the esterification reaction in the first esterification reactor used for preparing the high-viscosity PBAT melt is carried out at an absolute pressure of 40~60 kPa; and/or, the esterification reaction in the second esterification reactor used for preparing the high-viscosity PBAT melt is carried out at atmospheric pressure; and/or, the second esterification reactor used for preparing the high-viscosity PBAT melt is a horizontal reactor and comprises three compartments arranged in sequence from front to rear.

10. The preparation method according to claim 1, wherein, when preparing the high-viscosity PBAT melt, the preparation method further comprises a step of adding a side reaction inhibitor to the first compartment from front to rear of the second esterification reactor, the side reaction inhibitor is a Lewis base.

11. The preparation method according to claim 10, wherein, the Lewis base is selected from the group consisting of triethanolamine, quaternary ammonium salts, ethylenediaminetetraacetic acid, sodium acetate, sodium benzoate, sodium formate, potassium succinate, lithium acetate, zinc acetate, and combinations thereof; and/or, the mass of the Lewis base is 50~500 ppm of the mass of the high-viscosity PBAT melt.

12. The preparation method according to claim 1, wherein, when preparing the high-viscosity PBAT melt, the preparation method further comprises a step of adding a polymerization catalyst to the first prepolymerization reactor before carrying out the prepolymerization reaction.

13. The preparation method according to claim 12, wherein, the polymerization catalyst is prepared by reacting a titanate with a protonic acid under anhydrous conditions, removing alcohol by-products, and dissolving the reaction system in 1,4-butanediol.

14. The preparation method according to claim 13, wherein, the titanate is selected from the group consisting of tetrabutyl titanate, tetraisopropyl titanate, and tetra (2-ethylhexyloxy) titanate; and/or, the protonic acid is selected from the group consisting of formic acid, acetic acid, propionic acid, oxalic acid, malonic acid, succinic acid, citric acid, tripolyphosphoric acid, polyphosphoric acid, and combinations thereof; and/or, the mass ratio of the titanate to the protonic acid is 1:(0.5-2.0); and/or, the mass percentage of titanium element in the polymerization catalyst is 1.0%-3.0%.

15. The preparation method according to claim 12, wherein, the mass of titanium element in the polymerization catalyst accounts for 50~70 ppm of the mass of the high-viscosity PBAT melt.

16. The preparation method according to claim 1, wherein, the PBAT prepolymer introduced into the high-viscosity PBAT polymerization reactor has an intrinsic viscosity of 0.300~0.360; and/or, the residence time of material in the high-viscosity PBAT polymerization reactor is 75~120 min.

17. The preparation method according to claim 9, wherein, when preparing the high-viscosity PBAT melt, the 1,4-butylene adipate prepolymer is added to the second esterification reactor from the third compartment from front to rear of the second esterification reactor.

18. The preparation method according to claim 1, wherein, the low-viscosity PET final polymerization reactor is a horizontal polymerization reactor, and the length-to-diameter ratio thereof is (2.2~2.8):1.0.

* * * * *